Aug. 25, 1936.    H. A. TOOPS    2,052,369
EXAMINATION CONDUCTING DEVICE
Filed Aug. 1, 1934    8 Sheets-Sheet 1
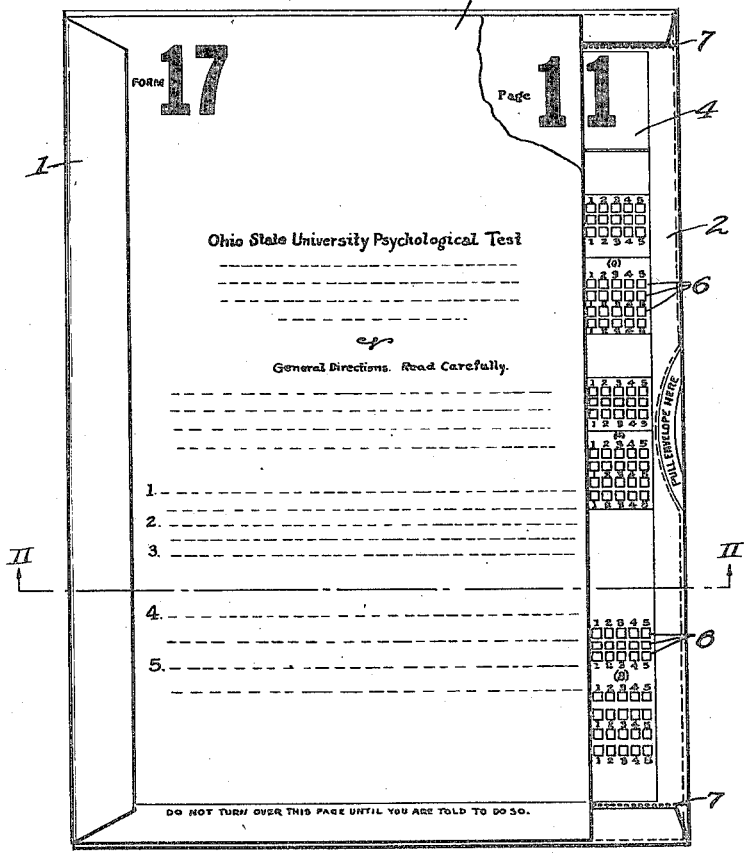
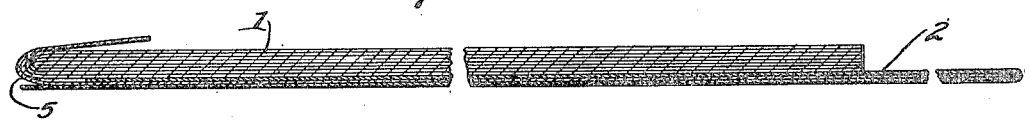
Inventor
Herbert A. Toops
By W. S. McDowell
Attorney Aug. 25, 1936.   H. A. TOOPS   2,052,369

EXAMINATION CONDUCTING DEVICE

Filed Aug. 1, 1934   8 Sheets-Sheet 2

Inventor
Herbert A. Toops

By  W. S. McDowell

Attorney

Aug. 25, 1936.  H. A. TOOPS  2,052,369
EXAMINATION CONDUCTING DEVICE
Filed Aug. 1, 1934  8 Sheets-Sheet 3

Inventor
Herbert A. Toops

Attorney

Aug. 25, 1936. H. A. TOOPS 2,052,369
EXAMINATION CONDUCTING DEVICE
Filed Aug. 1, 1934 8 Sheets-Sheet 4
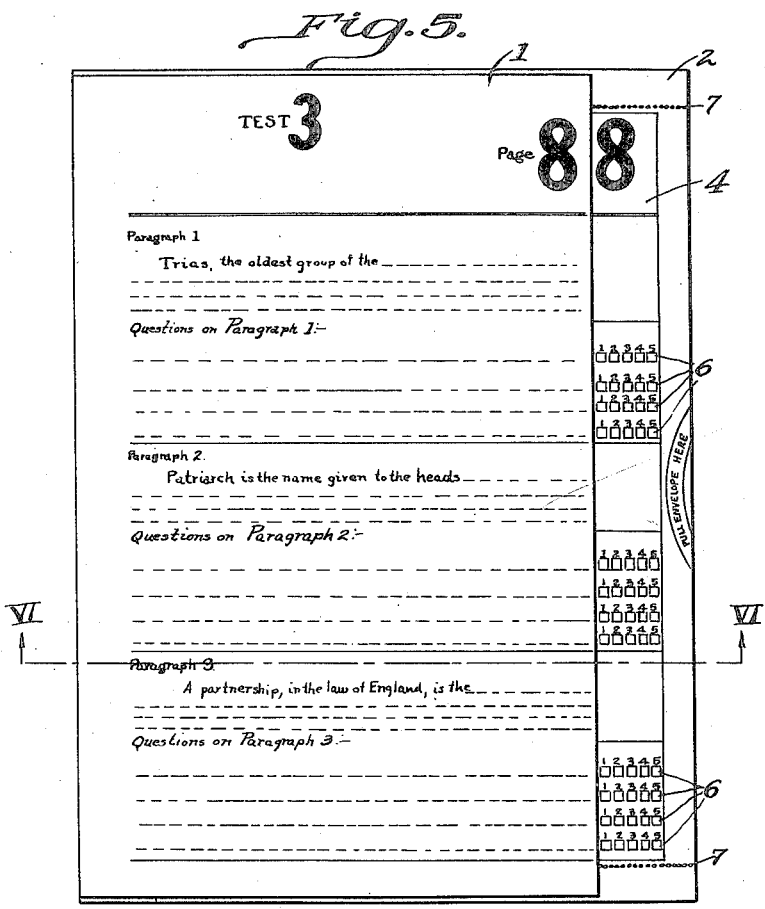
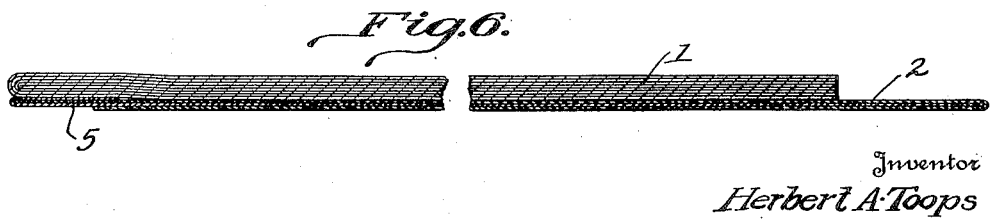

Aug. 25, 1936.                H. A. TOOPS                2,052,369
                    EXAMINATION CONDUCTING DEVICE
                  Filed Aug. 1, 1934         8 Sheets-Sheet 5

Fig. 7.

Inventor
Herbert A. Toops

Attorney

Aug. 25, 1936.   H. A. TOOPS   2,052,369
EXAMINATION CONDUCTING DEVICE
Filed Aug. 1, 1934   8 Sheets-Sheet 6

Inventor
Herbert A. Toops

By W. S. M. Howell

Attorney

Aug. 25, 1936.    H. A. TOOPS    2,052,369
EXAMINATION CONDUCTING DEVICE
Filed Aug. 1, 1934    8 Sheets-Sheet 7

Inventor
Herbert A. Toops
By W. J. McDowell
Attorney

Aug. 25, 1936.  H. A. TOOPS  2,052,369
EXAMINATION CONDUCTING DEVICE
Filed Aug. 1, 1934  8 Sheets-Sheet 8

Inventor
Herbert A. Toops
By
Attorney

UNITED STATES PATENT OFFICE 2,052,369

EXAMINATION CONDUCTING DEVICE

Herbert A. Toops, Columbus, Ohio

Application August 1, 1934, Serial No. 737,965

9 Claims. (Cl. 35—48)

This invention relates to improvements in examination conducting devices, and has particular reference to improved means for conducting so-called objective or psychological tests wherein a series of questions or problem situations are presented to a student, or one undergoing such an examination, and wherein each question or problem situation is followed by a series of selectable responses, and the examinee is required to elect and record a response or responses which he considers to be the correct reply or replies to the question or task propounded.

It is the primary object of the present invention to provide improved apparatus for carrying out tests or examinations of this nature and one wherein one or more complete and accurate automatically corrected records of the examinee's responses may be effected at low cost.

Other objects of the invention reside in the provision of an answer recording blank which is separably and adjustably related to the question propounding section of the device, and wherein provision is made for properly correlating various answer scoring divisions of the answer blank with the questions and responses contained on the question section, whereby after an examination has been completed, the scoring blank or section may be entirely removed from the question section, data pertaining to the examinee applied to the scoring section so that a permanent and lasting record of the examination may be retained and the question section used repeatedly in succeeding similar examinations.

In accordance with the present invention, my improved apparatus comprises a series of superposed individually identified pages which contain the questions and alternative correct and incorrect responses thereto and I slidably associate in connection with these pages for adjustable projection beyond the outer vertical edges of said pages an answer recording section. Said latter section is provided with a plurality of vertical divisions individually identified to correspond with the identification appearing on the question pages so that in use the proper vertical division of the scoring or recording section will be located immediately to one side of the outer vertical edge of the particular page which an examinee may be employing. Further, the present invention provides the vertical divisions of the scoring or recording section with a plurality of answer denoting spaces which are arranged in horizontal registration with the problem responses appearing on a complemental question page, the said spaces being suitably designated to correspond with the designations employed in designating or numbering the question responses.

For a further understanding of the invention, reference is to be had to the following description and the accompanying drawings, wherein:

Fig. 1 is a front view of an examination conducting device formed in accordance with the present invention;

Fig. 2 is a vertical transverse sectional view on an enlarged scale taken through the device on the plane indicated by the line II—II of Fig. 1;

Fig. 3 is a front elevation of the device disclosing the question bearing pages in open position with a vertical division of the answer recording section in proper registration with the answer responses contained on the problem page in view;

Fig. 5 is a view similar to Fig. 1 but illustrating the examination device reversed in position to carry on succeeding examinations;

Fig. 6 is a vertical transverse sectional view on the line VI—VI of Fig. 5;

Fig. 7 is a view similar to Fig. 4 disclosing the scoring or answer recording section in an extended position.

Referring more particularly to the drawings, my improved examination device comprises essentially a problem and response containing section 1 and a slidably associated answer or response recording section 2, these sections being referred to hereinafter as the problem and answer sections respectively.

The problem section comprises a series of suitably connected pages, usually stapled or bound in the form of a book, since by the construction of my apparatus, this problem section is of permanent value and may be used repeatedly for successive examinations. It is only the answer section which is used for carrying out but a single examination, and it is important that this be so in order that a school or other bureau may be provided with an appropriate record of the results of different examinations.

The pages of the problem are preferably printed and include a front page 3 which may contain instructions as to the method of employing the device in responding to questions. As shown in Fig. 3, the first question bearing page, as do all of the succeeding pages, contains a series of individually identified tests or problems, each of which problems is followed by a series of individually identified selectable responses. For instance, test 1 may contain "Good is the opposite of _____", No. 1—Excellent. No. 2—Cheerful. No. 3—Bad. No. 4—Wrong. No. 5—True. The examinee may select any one of these responses as being the proper response to the question proposed. If response No. 3 is considered by the examinee to be the correct response to this particular question, provision is made on the scoring section by which this choice of the examinee may be noted and recorded. Each page of the problem section is prominently individually identified, such as by use of the large numerals or consecutive page numbers disclosed in the upper right hand corner of each page. The various pages are turned by the student after the questions contained on each given page have been completed and responses thereto noted on the answer section. By reference to Fig. 3, it will be noted that opposite pages are reversely printed so that when the question section is opened, as in Fig. 3, the questions on the page to the right may be read in proper order while those on the page to the left will appear in inverse order. This is of importance in providing for the proper correlation between the problem and answer sections. For instance, the problem section is employed by the student to answer questions found on pages numbered 1 to 7. The position of the problem section is then bodily reversed and the problems contained on pages 8 to 15 are next answered, as shown particularly in Figs. 5 and 7. All of these problem bearing pages, however, are identical in form and arrangement.

Figure 4:
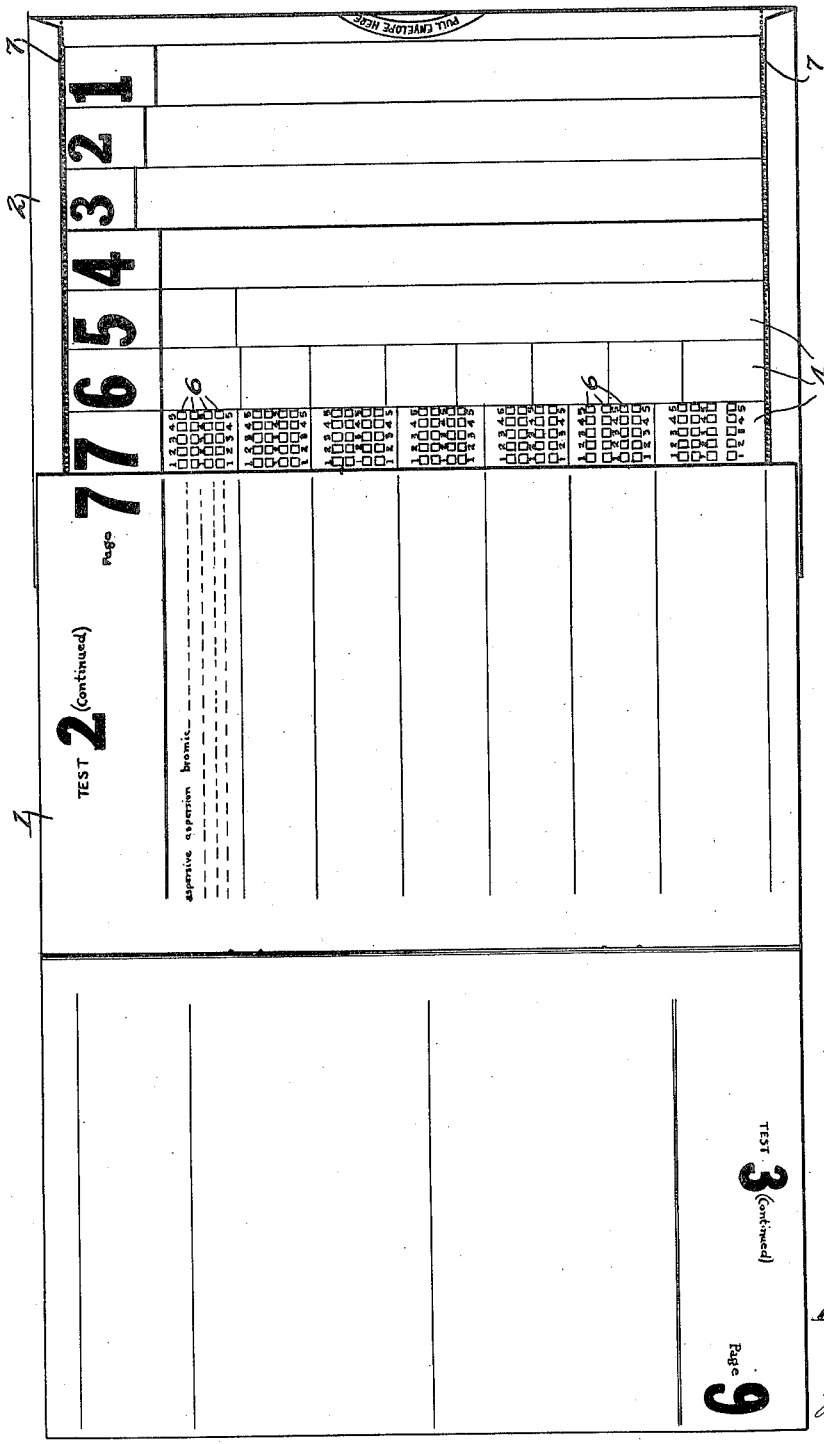
Fig. 4 is a similar view disclosing the answer recording section in a fully extended position with relation to the question bearing pages after one side of said section has been fully used.
Figure 8:
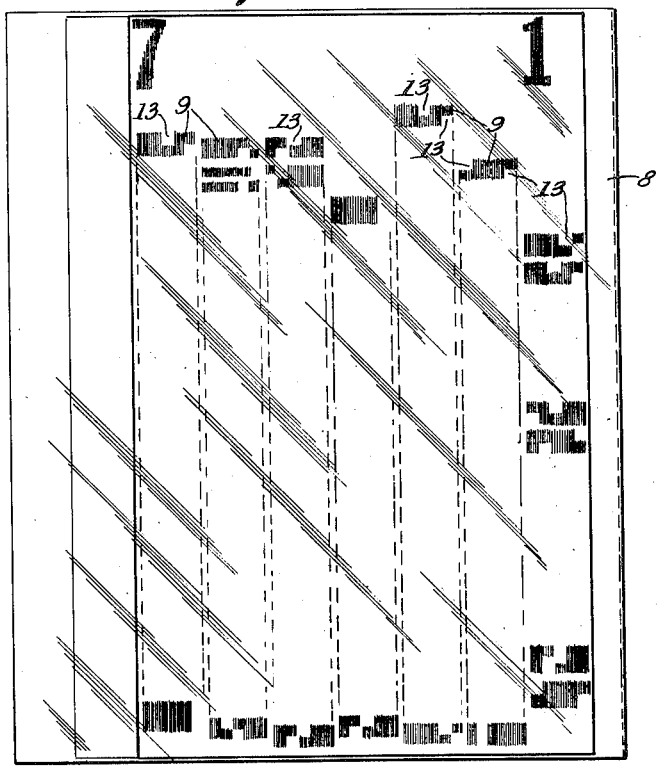
Fig. 8 is a front view of a scoring sheet or blank used in checking the student's responses.

The answer section in this instance comprises a paper closed along three sides and open along its fourth side throughout the length thereof. The front and back faces of the envelope are suitably printed, or otherwise designated, to provide a multiplicity of parallel vertical divisions, as at 4, which correspond with the number of problem bearing pages provided in the problem section 1. Each of the divisions 4 is individually identified, in a preferred manner, by a large and prominent number placed at the top thereof and which corresponds with the large page number appearing on each page of the answer section. The back of the problem section is provided with a relatively heavy cardboard back sheet 5, which is receivable within the envelope body of the answer section, whereby in use the problem and answer sections are connected but wherein provision is made for adjusting or sliding the answer section relative to the problem section in order that the vertical divisions 4 of the answer section may be brought into proper registration with the right vertical edge of the pages of the problem section. For instance, assuming that the student is answering the problems appearing on page 1 of the problem section, the envelope of the answer section is moved laterally until the division 4 having the numeral 1 at the top thereof appears immediately to the right of the problem page bearing the numeral 1. By this procedure, the student is informed that the proper division of the answer section to be marked in response to the problems appearing on page 1 is in true positional order for the conducting of the examination. Similarly, as shown in Fig. 4, when the student is answering the problems appearing on page 7 of the problem section, the envelope in this case will have been moved to the extreme right limit so that the answer denoting division thereof bearing the numeral 7 at the top thereof will be disposed immediately to the right of page 7 of the problem section. Since the envelope by receiving the back sheet 5 of the problem section cannot move vertically with respect to the problem section, it follows that proper registration of the answer section with the problem section is maintained at all times in the operation of the apparatus.

Each of the answer denoting divisions 4 of the answer section is provided with a plurality of individually identified boxes or spaces which are adapted to receive the answer-responding mark of the student to the problems presented. These boxes or spaces, as indicated at 6, correspond in numbering with the problem responses following each of the problems presented on the pages of the section 1, and the said boxes or spaces are horizontally aligned, through the construction of the envelope and the back sheet 5, with the problem responses of the section 1.

Assuming that the student is responding to the first problem appearing on page 1 as shown in Fig. 3. This problem reads "Good is the opposite of _____." and is followed by five choices or responses which are: 1—Excellent. 2—Cheerful. 3—Bad. 4—Wrong. 5—True. Since the answer receiving division numbered 1 of the answer section is proposed immediately at the right of problem page 1, the student after reviewing the problem, answers the same by placing in one of the suitably designated boxes or spaces an X mark, made by a pencil or other suitable recording instrument, in the particular box or space corresponding with the number of the response which he considers to be correct. Thus if the student considers the third response "bad" to be the correct answer, the space or box marked 3 of the answer section, immediately to the right of the problem page is so marked, and this system of responding to answers is carried on throughout all of the succeeding pages of the test. After all of the answers on a given page have been responded to, that page is then turned to the next succeeding page immediately under the same, and the answer section is moved so that the proper answer receiving division will be immediately in registration with the right vertical edge of the next page.

After the problems appearing on the first seven pages of the problem section have been answered, the student moves the envelope section back to its original position shown in Fig. 1. The problem section is then reversely folded on the cardboard back sheet and the entire unit is inverted which will arrange the problems appearing on pages 8 to 15 in proper registration with their corresponding answer spaces and the answering operation continued. The answer section is perforated as at 7 along its upper and lower edges so that these closed edges may be removed from the answer section following the completion of a given examination which renders the interior of the envelope accessible. The inner pages of the envelope may be provided with data pertaining to the examinee and also with educational qualifications and also with other printed indicia by which the statistical significance of the grade of the examinee in reference to said examnation may be noted. The envelope may then be suitably filed in the records of the institution giving the examination to form an accessible but permanent record.

Figure 9:
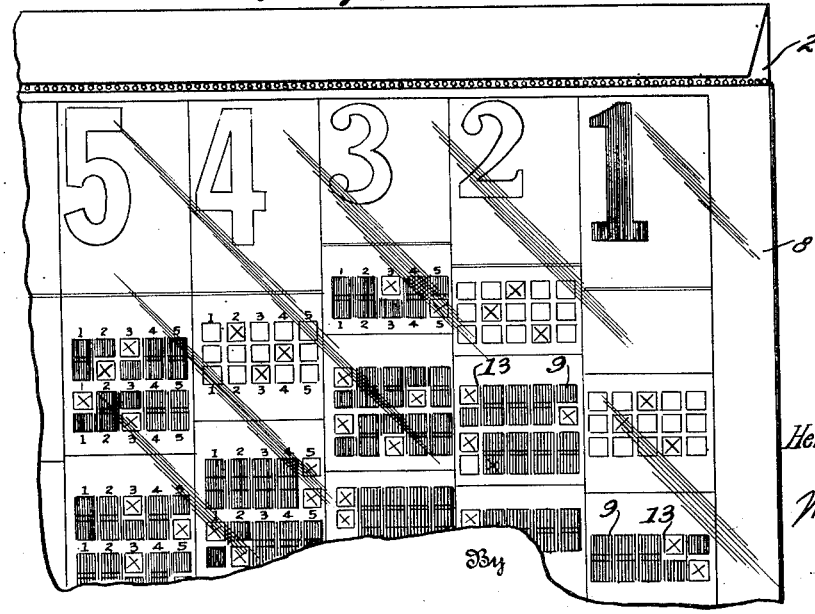
Fig. 9 is a fragmentary view of the scoring sheet arranged in place on the answer recording section.

In order to aid an examiner in scoring the responses to the examination of a given testee, I use a stencil blank 8 which may be formed from a relatively thin transparent or translucent paper, such as tracing paper. Printed on this blank in opaque colors are figures 9 between which are formed clear transparent spaces 13. This scoring sheet or blank is placed on the edge of the envelope 2 of the answer section so that the figures at the top thereof register with the enlarged figures at the top of the answer section, which brings the scoring sheet 8 automatically into proper registration with the boxes or spaces 6 appearing in the divisions 4. Since the figures 9 are relatively opaque, they will cover the boxes or spaces 6 which do not contain the correct response to a given problem, but since the spaces 13 are transparent, the examiner may readily note whether or not the testee has given the correct response to a problem since the correct spaces are readily viewable through the scoring sheet. It will be understood of course that the figures 9 and spaces 13 appearing on the scoring sheet are prearranged in accordance with each examination to develop correct and incorrect response locations, and that the relative arrangement of color to indicate wrong (the preferred form) and blank to indicate right may be reversed. The scoring blank being folded at or near its middle may be held in alignment simultaneously with respect to both sides of the folded envelope by grasping at its open edges, and the two sides of the envelope may be scanned in sucession to determine the score. When many examinations have been given, the services of the scoring sheet are dispensed with, and the envelope after administration has impressed thereupon by a printing-press in transparent ink, employing an etching or engraving, a pattern of either the correct, or incorrect answers, or both, by special designation of the two appropriate kinds, as, for example, different size of boxes or circles, inclusive or exclusive of superimposed shading, cross hatching and the like.

Figure 10:
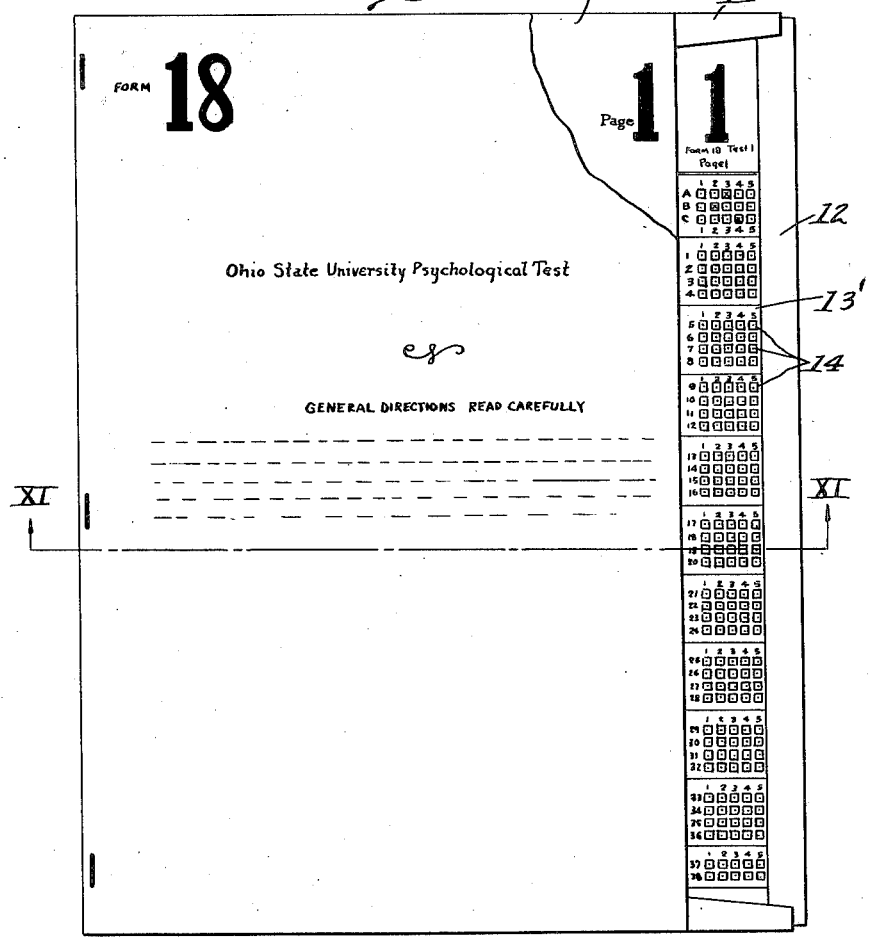
Fig. 10 is a front view of a modified form of examination conducting device.
Figure 11:
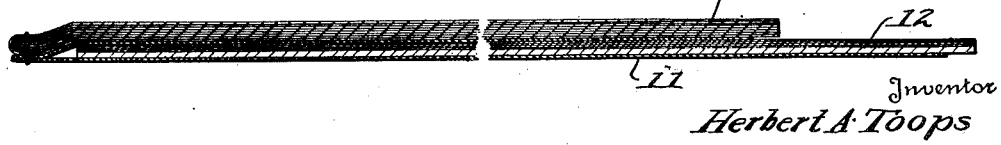
Fig. 11 is a vertical transverse sectional view on an enlarged scale taken through the device on the plane indicated by the line XI—XI of Fig. 10.
Figure 12:
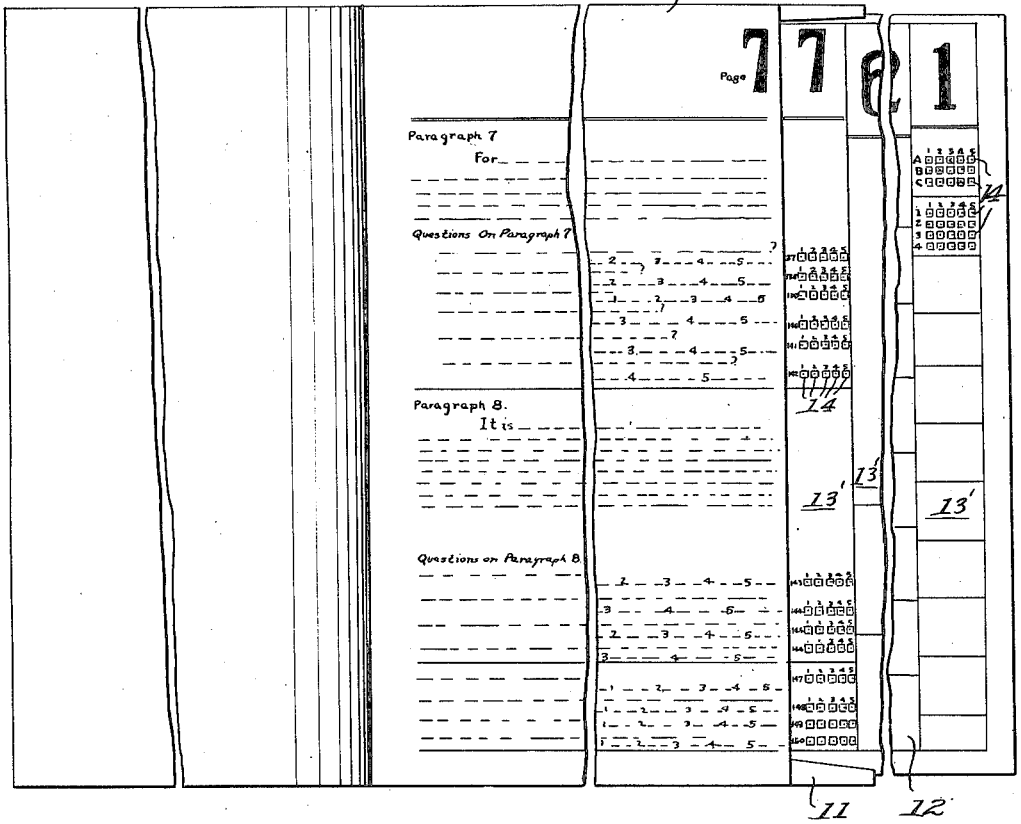
Fig. 12 is a front elevation showing the answer section in a fully extended position to register the answer spaces for the last page of questions with that page.
Figure 13:
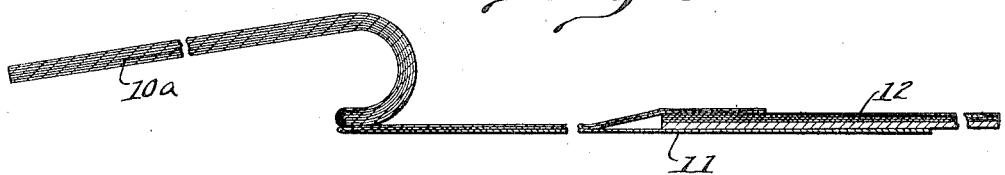
Fig. 13 is a vertical transverse sectional view taken through the device while in the position shown in Fig. 12.

In the form of my device illustrated in Fig. 10 and succeeding figures, the problem and response section is indicated at 10a, and like the section 1, comprises a plurality of superposed preferably printed pages containng the examination problems and individually identified responses. In this form of my invention, an envelope 11 closed along three edges and open along one side is suitably attached to and forms a part of the problem section. The answer recording section 12 is adapted to be inserted in this envelope and to be moved laterally with respect to the section 10a after the same manner as the answer section 2.

The answer section 12 in this instance is provided with the vertical divisions 13' suitably identified at their tops to correspond with the page numbers on problem section 10a. Each of the vertical divisions is provided with the individually identified boxes or squares 14 which correspond with the problem responses appearing on the pages of the section 10a. In the use of the answer section 12, the testee is provided with a sharp pointed instrument by which openings or holes are punched in the identified boxes 14 which are correlated with the answer responses. The answer section includes an outer sheet and a plurality of duplicate under sheets, all of these sheets being closed, bound or secured in a pad-like manner along their four outer edges. The under sheets, which may be termed scoring sheets, include spaces arranged in registration with the boxes 14, the incorrect spaces being preferably of solid color while the correct spaces are left uncolored with a surrounding border of preferably slightly larger size. After the examination has been completed, the outer sheet of the scoring pad may be removed and the scoring sheets separated. With the use of this type of scoring pad, the testee may determine the grade or outcome of the examination where such a provision is considered administratively desirable. To provide for easy perforation of the sheets, a sheet of easily perforated material, such as strawboard, either with or without one impenetrable surface is to be fastened to the protruding edges of the envelope or a loose sheet thereof may be inserted in the envelope to be moved by the testee in the operation of moving the scoring sheets.

With the use of these examination conducting devices, it will be noted that the problem and alternative response containing sections may be used repeatedly for any number of succeeding examinations. Therefore, these sections can be carefully prepared and printed since they are not discarded, as has been the case in many prior devices, following the completion of any one examination. The answer receiving sections, of course, require replacement for each examination, but these sections are relatively inexpensive forms and moreover are quite useful in keeping records of examination results.

It likewise will be observed that by taking care to print the questions of like numbering in a standard position on the page of their appearance in a plurality of forms of the examination in the same or different subject matters, one answer section may be used for any number of different examinations by simply so disposing the right and wrong answers to the several questions in the same patterns as of the initially designed scoring sheet.

What is claimed is:

1. Examination conducting apparatus comprising a section composed of a series of superposed individually identified leaves of uniform width secured together to form a book, each of said leaves containing indicia setting forth a series of individually identified problems and selectable answer responses thereto, and an answer recording section adjustable laterally with respect to said problem containing leaves, said answer section being suitably marked into vertical divisions corresponding to the number of problem bearing leaves and having indicia thereon corresponding with the identification of each leaf, whereby said answer section is slidably adjustable so that the exposed vertical divisions thereof immediately adjacent to the outer vertical edge of a given leaf corresponds with the problem and responses appearing on said given leaf, and means for maintaining the said sections in relative registration throughout all operative positions of relative adjustment thereof.

2. Examination conducting apparatus comprising a section composed of a series of superposed individually identified leaves of uniform dimensions secured together in book-like form, each of said leaves containing indicia setting forth a series of individually identified problems and selectable answer responses thereto, and an answer recording section adjustable laterally with respect to said problem containing leaves, said answer section being suitably marked into vertical divisions corresponding to the number of problem bearing leaves and having indicia thereon corresponding with the identification of each leaf, whereby said answer section may be adjusted so that the exposed vertical divisions thereof immediately adjacent to the outer vertical edge of a given leaf corresponds with the problem and responses appearing on said given leaf, each of said divisions containing answer denoting divisions arranged in horizontal registration with the problem responses appearing on a complemental leaf and conforming in number to said responses, and means for maintaining said sections in relative registration throughout all operative positions of relative adjustment thereof.

3. Examination conducting apparatus comprising a problem section composed of a plurality of sheets of uniform area secured together in book-like form, and an answer section slidably mounted for lateral adjustment below said problem section and adjustable to one side of said problem section to expose successive areas of said answer section to view immediately contiguous to the right vertical edge of the sheets of the problem section, the portions of said answer section not exposed to view being concealed by the problem section.

4. Examination conducting apparatus comprising a problem section composed of a plurality of leaves bound together to form a book, each leaf being of uniform size and having thereon indicia presenting problems and selectable and individually identified responses to such problems, an answer denoting section containing a plurality of individually identified divisions corresponding in number and order with said responses, and guide means providing for relative sliding adjustment of said answer and problem sections to maintain registration of said divisions with said responses throughout the full range of relative adjustment of said sections.

5. Examination conducting apparatus comprising a series of superposed imperforate individually identified leaves of uniform size secured together in book-like form, each of said leaves containing indicia setting forth a series of individually identified problems and selectable individually identified responses thereto, an envelope closed along three sides connected with said leaves, and a recording section slidably received within said envelope, said recording section being marked into vertical divisions corresponding to the number of problem bearing leaves and containing indicia corresponding with the identification of each leaf, said recording answer sheet being guided by said envelope so that the exposed vertical divisions thereof immediately adjacent to the outer vertical edge of a given leaf will correspond with the problems and responses appearing on said given leaf, each of said divisions containing suitably identified answer denoting spaces arranged in horizontal registration with the problem responses appearing on a complemental leaf.

6. Examination conducting apparatus comprising a problem section composed of a plurality of imperforate leaves of substantially uniform size secured together in book-like form, said leaves containing indicia representing suitably identified problems and choice responses thereto, a back sheet permanently connected with said problem section, and an answer section comprising an envelope open along one edge to receive said back sheet, said answer section containing suitably identified answer receiving divisions positioned in correspondence with the indicia representing problems and responses on the leaves of said problem section, said answer section being laterally adjustable with respect to one edge of the leaves of said problem section.

7. Examination conducting apparatus comprising a section composed of a plurality of leaves of substantially uniform size secured together to form a book, said leaves containing indicia representing problems, an envelope open along one edge connected with the back of said problem section, an answer receiving section comprising a sheet arranged to be received in said envelope and to be withdrawn from the open edge thereof so that successive portions of said answer section will project beyond one edge of the leaves of the problem section.

8. Examination conducting apparatus comprising a book-like section having sheets containing indicia representing problems, an envelope open along one edge connected with the back of said problem section, an answer receiving section comprising a sheet arranged to be received in said envelope and to be withdrawn from the open edge thereof so that successive portions of said answer section will project beyond one edge of the leaves of the problem section, said answer section being provided with a plurality of divisions for denoting problem answers, and a scoring sheet attached to the under side of said answer section.

9. Examination conducting apparatus comprising a book-like section containing a plurality of sheets having indicia thereon representing problems, an envelope open along one edge connected with the back of said problem section, an answer receiving section comprising a sheet arranged to be received in said envelope and to be withdrawn from the open edge thereof so that successive portions of said answer section will project beyond one edge of the sheets of the problem section, said answer section being provided with a plurality of divisions for denoting problem answers, and a scoring sheet attached to the under side of said answer section, said scoring sheet being provided with divisions corresponding with the answer denoting spaces of said answer section.

HERBERT A. TOOPS.